Sept. 28, 1926.  W. PEACOCK  1,601,597
MIRROR
Filed April 3, 1926
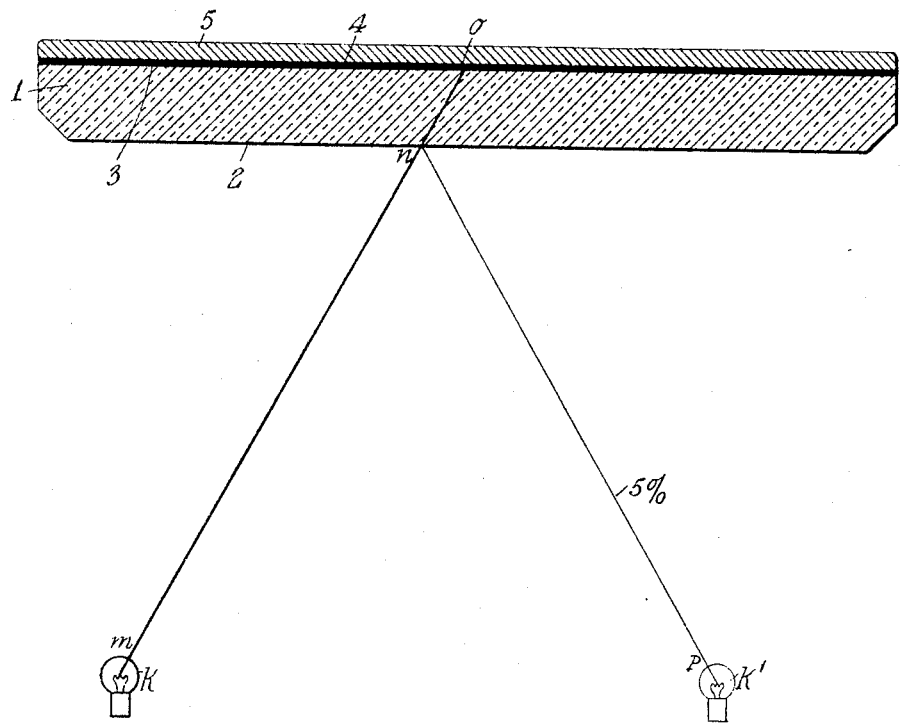

Patented Sept. 28, 1926.

1,601,597

UNITED STATES PATENT OFFICE.

WILLIAM PEACOCK, OF LITITZ, PENNSYLVANIA, ASSIGNOR TO WOOLWORTH CHEMICAL CO., OF LITITZ, PENNSYLVANIA. A CORPORATION OF PENNSYLVANIA.

MIRROR.

Application filed April 3, 1926. Serial No. 99,491.

My invention consists in the novel features hereinafter described, reference being had to the accompanying drawing which illustrates one embodiment of my invention selected by me for purposes of illustration, and the said invention is fully disclosed in the following description and claims.

The object of my invention is, to produce a permanent mirror capable of reflecting images with the same exactness of form and color as is produced by the best quality of silvered mirrors, but which will reflect the said images with greatly lowered intensity, so that while the eye will receive from it a perfectly accurate reflection, incandescent objects and other objects of intense illumination will be so markedly subdued, as to produce no irritating effects on the retina, and no confusion or obscuration of other images reflected by the mirror at the same time. Such a mirror, which I have produced commercially, is particularly adapted for use as a rear view mirror for automobiles, but it may also be used for any other purpose for which it may be found advantageous or desirable.

It has been scientifically determined, that where light from illuminated objects falls upon the surface of an ordinary silvered mirror, an extremely small percentage of the light is reflected from the front surface of the glass plate supporting on its back the silver coating, the greatest amount of such light passing through the glass and being reflected to the eye of the observer from the rear face of the glass. There are, therefore, two separate reflections produced, the one from the front face of the glass, and the other from the rear face. The amount of light reflected from the front face of an ordinary mirror is approximately 5%, and the amount of light reflected from the rear face is approximately 95% of the light transmitted through the glass, about 5% being absorbed by the silver surface. These two reflections are not coincident, and their lack of coincidence varies with the thickness of the glass plate, and the variations in the angles of incidence. A serious lack of definition would usually result, except when the observer was directly in front of the mirror, were it not for the fact that the amount of light reflected from the rear face of the glass is so vastly in excess of the amount reflected from the front surface, as to render the latter negligible.

In carrying my invention into effect, I have aimed at the production of a cheap mirror, produced by coating a plate of clear glass in such a manner as to prevent practically any specular reflection or diffuse reflection of light from the rear face of the glass, and to secure only such images as are reflected from the front surface of the glass without having them obscured, or modified, or affected, by any appreciable amount of light reflected from the rear face of the glass, or the coating applied thereto.

I am aware of the fact that it is well known, that a certain kind of reflection may be obtained by providing a piece of clear glass with a dark backing, such as, cloth or paper, and that objects may be said to be roughly mirrored therein. I am also aware of the fact that some kinds of colored glass, such as, so-called artists' black glass, for example, will produce a very satisfactory reflection from its front surface, the light penetrating into the glass being absorbed or dispersed by the pigmentation thereof. This glass, however, is extremely expensive and difficult to obtain.

In my preliminary experiments, I sought to obtain the desired result by painting on the back of a piece of glass with a black pigment, but I found that the results were most unsatisfactory, and the images obtained were not comparable at all with those obtained from a silvered mirror, for the reason that notwithstanding the fact that such black or dark coating, as in the previously known dark backing, would absorb some of the light, there would necessarily result in addition to a small amount of specular reflection from the rear surface a considerable amount of diffuse reflection or scattered light from the rear surface or from the adjacent parts of the pigment coating. When it is realized that the amount of light reflected from the front surface of the glass is only substantially 5% of the light passing said front surface, it will be seen that any material amount of light reflected or scattered from the rear surface of the glass, or from the coating applied thereto, will interfere with, confuse, and spoil the definition of the image of low intensity reflected from the front surface of the glass, and that in order that these images of low intensity may be effective, it is necessary to positively preclude the possibility not only of the specular reflection but also of the diffuse reflection or scattering of any material portion of the light from the rear face of the glass, or from the coating applied thereto, which must necessarily be of such character and be so applied as to absorb substantially all of the light which passes beyond the front face of the glass.

I discovered as the result of extended experimentation, that by applying to the rear face of a piece of clear plate glass, a uniform light absorbing coating in optical contact throughout substantially its entire extent, and of such a character as to absorb substantially all of the light passing therethrough, that I can prevent not only any material specular reflection, but also any material diffuse reflection of light from the rear face of the glass, or the contiguous face of the coating, thus leaving the light reflected from the front face of the glass to carry the only image reflected thereby, and produce, therefore, a reflection as true both as to form and color as can be obtained from a silvered mirror, but at approximately one-twentieth of the illumination. This mirror was produced for the first time by me, and I claim it broadly as my invention.

In the accompanying drawing, the figure represents a sectional view of a mirror embodying my invention, and designed particularly as a rear view mirror for automobiles.

In carrying my invention into effect, I take commercial high grade polished plate glass preferably about $\frac{3}{16}$th of an inch thick, of the desired size, and preferably having its front edges beveled by grinding in the usual manner. The glass plate is thoroughly cleaned as by washing in hot soapy water, after which the rear face of the glass is wiped off with benzine or other volatile fluid, to obtain a chemically clean surface, in order that the coating may be uniformly applied in optical contact at all points of the surface treated. I then apply to the rear face of the glass plate, in optical contact therewith throughout its entire extent, a coating of material capable of absorbing substantially all light rays falling upon it. By optical contact I mean that the light absorbing coating is applied in such intimate relation with the rear face of the glass that the rear face of the glass and the front face of the coating, become for all practical purposes, a single plane or surface, so far as their behavior with respect to light is concerned. In order to secure this intimate contact between the rear face of the plate and the coating, the glass is preferably placed in a tray in such a manner that only the face to be coated is exposed, and is then heated in a gas oven to approximately 180 degrees F., after which it is removed and immediately sprayed with the coating material. The plate is again heated in an oven at a temperature of approximately 130 degrees F., to effect the drying and preserve the optical contact between the coating and the glass. This renders the mirror permanent and prevents the coating, or any portion of it, from getting out of optical contact with the rear face of the glass under ordinary atmospheric condition. To protect the coating, and further prevent it from being adversely attacked by extraordinary atmospheric conditions, it is preferably provided with a protecting coating of similar material, as hereinafter described.

The coating which I prefer to employ consists of liquid pyroxylin lacquer combined with a black pigment, as lampblack, for example. I have found as a matter of experiment, that the addition of a small quantity of a colored pigment by which I mean one of the primary colors of the spectrum, (or the hues thereof) and excluding white and black, appears to impart a velvety character to the coating and somewhat increase its light absorbing qualities, without however, imparting any of this color in any way to the reflected image, which of course, is reflected only from the front plate of the glass, and which is not in any way modified by the color of the coating, the function of which is merely to absorb substantially every particle of light passing beyond the front surface of the glass, and preventing not only specular reflection, but also diffuse reflection or scattering of light from the rear face of the glass, or from the contiguous face of the coating. The pigment which I prefer to use is a blue pigment, and I have found the best results obtained by the use with lampblack or other black, of cobalt blue, in the proportion of substantially five parts of the black pigment to one part of the blue pigment, or cobalt.

After the coating is entirely dried and before the heat has left the glass, a protecting coating is applied to the first coating and dried in the same way. This protecting coating may be of any desired character, but I prefer to employ pyroxlin lacquer containing a suitable pigment, as a gray pigment for example, which will protect the light absorbing coating, and will not show the dust. The protecting coating above described, will protect the light absorbing coating from the effects of atmospheric conditions, and it will be noted that I preferably employ the same type of material for both the light absorbing coating and the protecting coating, to wit, pyroxylin lacquer containing the pigment material. It follows, therefore, that the two coatings expand and contract practically equally under changes of temperature, so that there is no tendency for the protecting coating, under the effects of temperature changes, disturbing the optical contact between the light absorbing coating and the rear face of the glass. I have also found, by practical experience, that the pyroxylin lacquers are sufficiently elastic to take care of any inequality between their expansion and contraction under temperature changes, and that of the glass plate, and in practice it has been found that there is no tendency, whatever, of the light absorbing coating, or any portion of it, losing its optical contact with the glass, although exposed to high or low temperatures, or extremes of dryness and humidity.

In the accompanying drawing, 1, represents the glass plate, having the front reflecting face, 2, and the rear face, 3, 4, represents the light absorbing coating applied to the face, 3, in uniform optical contact therewith, and constructed to absorb substantially all light passing beyond the front face, 2, and to prevent either specular reflection or diffuse reflection of light from the rear face, 3, or the contiguous face of the coating, 4. 5, represents the exterior protecting coating applied over the back of the light absorbing coating.

In the drawing for purposes of illustration, I have shown a line $m$, $n$, representing the rays of light from an object as an electric light indicated at $k$, and extending therefrom to the front surface, 2, of the glass, and through the glass of the mirror to the rear surface, 3, and into the light absorbing coating, 4, as indicated at $o$. I have also indicated by the light line, $n$, $p$, the reflection from the front face, 2, of the mirror produced by the light ray, $m$, $n$, and being substantially 5% only in intensity, while giving a perfect and accurate reflection of the object, $k$, as indicated in light lines at $k^1$, but in proportionally lower illumination, that is to say, as 5% to 100%. This is, of course, merely a diagrammatic representation of the matter for the purpose of illustration.

It will be understood, that the mirror may be supported in any suitable part of an automobile or vehicle, or placed where its use may be advantageous, by any desired form of mounting or support.

The mirror embodying my invention will be found to reflect all objects with the same clarity and perfection of form and color, as the best grade silvered mirror without the slightest distortion, confusion or lack of definition, but at a greatly reduced degree of illumination, approximately one-twentieth of the amount of light reflected from a silvered mirror, but with no loss of either detail or accuracy. There will be neither reflection or diffusion of light to any appreciable extent whatever from the rear face of the glass or the contiguous coating, to mar or interfere with the perfect image reflected from the front face of the glass. The advantages of this mirror as a rear view mirror, will be at once apparent. In the first place, during the day, regardless of whether there is high or low illumination, a perfect reflection is provided at all times equal to that of any silvered mirror, while the fact that only approximately one twentieth of the light is reflected to the eye of the observer, results in a remarkable relief to the eye, and which adds greatly to comfort in driving. In driving at night with any mirror, there is little reflected, except incandescent or very highly illuminated objects, particularly head lights of vehicles approaching from the rear; which in the case of an ordinary mirror produce an intense glare, blinding the observer by effecting contraction of the iris, so that nothing is clearly seen in the mirror, nor on the road ahead.

By the use of my improved mirror, the light from the head lights of vehicles in the rear, or other objects of intense illumination falling upon the mirror is approximately nineteen-twentieths absorbed, approximately one-twentieth only being reflected from the front face of the mirror, with the result that the image even of incandescent objects does not irritate the retina, or effect any material closing of the iris, and the observer is, therefore, given a perfectly accurate reflection of what is behind him, in so far as it is illuminated at all, while his eyes remain in a condition to see objects forward of his car, as clearly as if head lights or other incandescent or highly illuminated objects were not being reflected in the mirror at all. My improved mirror contributes greatly at night to safety in driving automotive vehicles, and in the day time contributes greatly to the comfort and relaxation of the driver by relieving his eyes of unnecessary strain, while presenting as clear and accurate reflected images, as can be obtained from the best quality of silvered mirrors.

In carrying out my invention, I am able to provide a mirror having the characteristics previously described, which can be commercially produced at a low price, enabling it to be readily made up and sold cheaply, as a rear view mirror for automobiles, or for any other purpose for which its use may be found advantageous or desirable.

What I claim and desire to secure by Letters Patent is:—

1. A permanent mirror for use as a rear view mirror for automobiles consisting of a plate of clear glass having its rear face provided with a permanent and uniformly light absorbing coating, applied to said rear face in, and permanently maintained in optical contact therewith, throughout the entire rear surface of said plate, said coating being capable of absorbing substantially all the light passing to the rear of the front face of the glass plate, and of preventing any reflection or diffusion of light from the rear face of the glass plate or the contiguous face of the coating, which would materially affect the clarity of images reflected from said mirror at reduced illumination.

2. A permanent mirror for use as a rear view mirror for automobiles consisting of a plate of clear glass having its rear face provided with a permanent and uniformly light absorbing coating, applied to said rear face in, and permanently maintained in optical contact therewith, throughout the entire rear surface of said plate, said coating being capable of absorbing substantially all the light passing to the rear of the front face of the glass plate, and of preventing any reflection or diffusion of light from the rear face of the glass plate or the contiguous face of the coating, which would materially affect the clarity of images reflected from said mirror at reduced illumination, and a protecting coating of like character to the light absorbing coating and affected in like manner by temperature changes, for preserving the light absorbing coating, and maintaining the optical contact between it and the glass.

3. A permanent mirror for use as a rear view mirror for automobiles consisting of a plate of clear glass having its rear face provided with a permanent and uniformly light absorbing coating, consisting of a pyroxylin lacquer, combined with light absorbing material applied to said rear face in, and permanently maintained in, optical contact therewith, throughout the entire rear surface of said plate, said coating being capable of absorbing substantially all the light passing to the rear of the front face of the glass plate and of preventing any reflection or diffusion of light from the rear face of the glass, or from the face of the coating, which would materially affect the clarity of images reflected from said mirror at reduced illumination.

4. A permanent mirror for use as a rear view mirror for automobiles consisting of a plate of clear glass having its rear face provided with a permanent and uniformly light absorbing coating, consisting of a pyroxylin lacquer, combined with light absorbing material applied to said rear face in, and permanently maintained in, optical contact therewith, throughout the entire rear surface of said plate, said coating being capable of absorbing substantially all the light passing to the rear of the front face of the glass plate and of preventing any reflection or diffusion of light from the rear face of the glass, or from the face of the coating, which would materially affect the clarity of images reflected from said mirror at reduced illumination, and a protecting coating of pyroxylin lacquer combined with a pigment affected in like manner by temperature changes, for preserving the light absorbing coating and maintaining the optical contact between it and the glass.

5. A permanent mirror for use as a rear view mirror for automobiles, consisting of a plate of clear glass having its rear face provided with a permanent and uniformly light absorbing coating comprising a black pigment modified by a pigment of primary color applied to said rear face in and permanently maintained in optical contact therewith throughout the entire rear surface of said plate, said coating being capable of absorbing substantially all the light passing to the rear of the front face of the glass plate and of preventing any reflection or diffusion of light from the rear face of the glass plate or the contiguous face of the coating, which would materially affect the clarity of images reflected from said mirror at reduced illumination.

6. A mirror consisting of a plate of clear glass, the front face of which provides the only reflecting surface of the mirror, the rear face of the glass plate being provided with a light absorbing and non-reflecting coating comprising a black pigment combined with a blue pigment and adhesively applied in uniform and optical contact throughout the entire rear surface of the glass plate, said coating being capable of absorbing substantially all of the light passing in rear of the front face of the glass plate and preventing the specular reflection or the diffuse reflection of light from the rear face of the glass plate or from the contiguous face of said coating, whereby true, accurate, and well defined images will be at all times reflected from the mirror at greatly reduced illumination.

7. A mirror consisting of a plate of clear glass, the front face of which provides the only reflecting surface of the mirror, the rear face of the glass plate being provided with a light absorbing and non-reflecting coating comprising a black pigment combined with cobalt blue, and adhesively applied in uniform and optical contact throughout the entire rear surface of the glass plate, said coating being capable of absorbing substantially all of the light passing in rear of the front face of the glass plate and preventing the specular reflection or the diffuse reflection of light from the rear face of the glass plate or from the contiguous face of said coating, whereby true, accurate, and well defined images will be at all times reflected from the mirror at greatly reduced illumination.

In testimony whereof I affix my signature.

WILLIAM PEACOCK.